(12) United States Patent
Coffey

(10) Patent No.: US 6,200,242 B1
(45) Date of Patent: Mar. 13, 2001

(54) POWERTRAIN WITH A MULTI-SPEED TRANSMISSION

(75) Inventor: Dan Coffey, Howell, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 09/458,970

(22) Filed: Dec. 10, 1999

(51) Int. Cl.$^7$ ............................. F16H 3/58; F16H 57/10
(52) U.S. Cl. ............................................. 475/281; 475/313
(58) Field of Search .................................. 475/281, 283, 475/285, 287, 291, 313, 319, 325

(56) References Cited

U.S. PATENT DOCUMENTS

| | | | |
|---|---|---|---|
| 2,873,625 | * 2/1959 | Simpson | 475/284 |
| 4,872,376 | * 10/1989 | Asada et al. | 475/281 |
| 4,916,980 | * 4/1990 | Asada et al. | 475/281 |
| 5,383,822 | * 1/1995 | Pierce | 475/281 |
| 5,690,578 | * 11/1997 | Hall, III | 475/271 X |

* cited by examiner

Primary Examiner—Charles A Marmor
Assistant Examiner—Ankur Parekh
(74) Attorney, Agent, or Firm—Laura C. Hargitt

(57) ABSTRACT

A powertrain has an engine and a transmission. The transmission provides six forward speed ratios and one reverse speed ratio between the engine and an output shaft of the transmission. The transmission has two compound planetary gear sets each having three rotatable members including a sun gear member, a ring gear member, and a planetary carrier assembly member. The ring gear member of one of the planetary gear sets is continuously connected with the output shaft. Each planetary gear set has at least two members that are connectable to receive power from the engine through selectively engageable rotating torque transmitting mechanism. One member of each planetary gear set are interconnected and operatively connected with a selectively engageable stationary torque transmitting mechanism to provide reaction members during the reverse speed ratio. Two additional selectively engageable stationary torque transmitting mechanisms are provided to establish reaction members in the other planetary gear set during five of the six forward speed ratios.

8 Claims, 1 Drawing Sheet

| STICK DIAGRAM | | CLUTCHING ELEMENTS | | | | | | | | |
|---|---|---|---|---|---|---|---|---|---|---|
| GEAR | RATIO | 34 | 48 | 36 | 50 | 46 | 38 | 40 | 42 | 44 |
| REV | 4.160 | X | | | | X | G | | | |
| NEU | – | | | | | | | | | |
| 1st | 4.225 | X | | | X | | G | | | C |
| 2nd | 2.600 | | X | | X | | | X | C | C |
| 3rd | 1.610 | X | | | X | | | X | | C |
| 4th | 1.310 | | X | | | | | X | X | C |
| 5th | 1.000 | | | X | | | | X | X | |
| 6th | 0.806 | | X | X | | | | X | C | |
| 7th | | | | | | | | | | |
| 8th | | | | | | | | | | |

X: ON, CARRYING TORQUE
G: GARAGE-SHIFT ELEMENT, ON AND CARRYING TORQUE
C: ON ONLY FOR MANUAL RANGE COAST BRAKING

POWERTRAIN WITH A MULTI-SPEED TRANSMISSION

TECHNICAL FIELD

This invention relates to powertrains with multi-speed transmissions and more particularly to transmissions having at least six forward speeds.

BACKGROUND OF THE INVENTION

In an effort to improve the overall performance of a vehicle while also reducing the mass of the vehicle, the number of speed ratios available through the transmission is increased. This permits a more efficient use of the engine operating range while also reducing the size of the engine. The increased number of speed ratios allows for a higher low gear ratio which will result in a reduced size torque converter.

The number of forward speed ratios in power transmissions has increased from two to five over a number of years. Many of the five speed transmissions incorporate two or three interconnected simple or compound planetary gear sets and five or six selectively engageable clutches or brakes. These transmissions quite often include one or more bridging clutches when two interconnected planetary gear sets are utilized. One example of this type of power transmission can be seen in U.S. Pat. No. 5,830,102 issued to Coffey on Nov. 3, 1998.

Currently many manufacturers are considering increasing the number of ratios to six or seven. These transmissions generally contain three planetary gear sets. One such transmission is seen in U.S. Pat. No. 3,946,623 issued Mar. 30, 1976. This prior art transmission incorporates four interconnected planetary gear sets, three clutches and four brakes when more than five speed ratios are to be attained. Another known six speed transmission is shown in U.S. Pat. No. 4,070,927 issued Jan. 31, 1978. A six speed planetary having two simple planetary gear sets is disclosed in U.S. Ser. No. 09/383,429 filed Aug. 27, 1999 and assigned to the assignee of this application.

SUMMARY OF THE INVENTION

It is an object of the present invention to provide an improved multi-speed planetary transmission.

In one aspect of the present invention, the planetary transmission has two compound planetary gear sets and seven selectively engageable torque transmitting mechanisms. In another aspect of the present invention, the torque transmitting mechanisms include four rotating mechanisms and three stationary mechanisms. In yet another aspect of the present invention, one of the stationary mechanisms is a mechanically engaging device.

In still another aspect of the present invention, the ring gear member of one of the planetary gear sets is continually connected for common rotation with an output shaft and the ring gear member of the other planetary gear set is continually connected for common rotation with the carrier assembly member of the one planetary gear set.

In yet still another aspect of the present invention, three of the rotating mechanisms are input drive devices and one of the rotating mechanisms is an interconnecting device. In a further aspect of the present invention, the mechanically engaging device is utilized only in the establishment of a reverse speed ratio. In yet a further aspect of the present invention, two one-way torque transmitting mechanisms are provided to establish reaction members in one of the planetary gear sets.

The present invention employs two planes of planetary gears to provide six forward speed ratios and one reverse ratio. Two compound planetary gear sets are interconnected and controlled by four selectively actuated, rotating torque transmitting mechanisms or clutches and three selectively actuated, stationary torque transmitting mechanisms or brakes. The torque transmitting mechanisms are actuated in combinations of three to establish the reverse speed ratio and the six forward speed ratios which include four underdrive ratios, a direct drive ratio and an overdrive ratio.

The overall ratio ($1^{st}/6^{th}$) of the forward speed ratios is greater than 5.2 and the $1^{st}$ to $2^{nd}$ ratio step is less than 1.7. The high overall ratio and the low $1^{st}$ to $2^{nd}$ step ratio permits a tighter torque converter to be incorporated into the transmission. Since the tighter torque converter is more efficient, an increase in overall powertrain efficiency is attained. Typically a one-percent (1%) increase in torque converter efficiency results in a one-half of one percent (½%) improvement in combined fuel economy.

The step ratio between the two highest speed ratios ($5^{th}$ and $6^{th}$) is less than 1.25. The small step size allows a reduction in top gear gradability since the ratio interchange ($6^{th}$ to $5^{th}$) would be substantially imperceptible to the driver. The reduction in top gear gradability typically improves fuel economy.

To further improve the efficiency of the transmission, a mechanical brake, often termed a "dog clutch", can be employed to establish the reaction members in the planetary gear sets. This brake is engaged without a torque load being present and one of the other selectively engageable torque transmitting mechanisms is actuated to complete the vehicle launch or "garage shift". This mechanism can be controlled mechanically or hydraulically.

DESCRIPTION OF AN EXEMPLARY EMBODIMENT

Figures 1, 2:
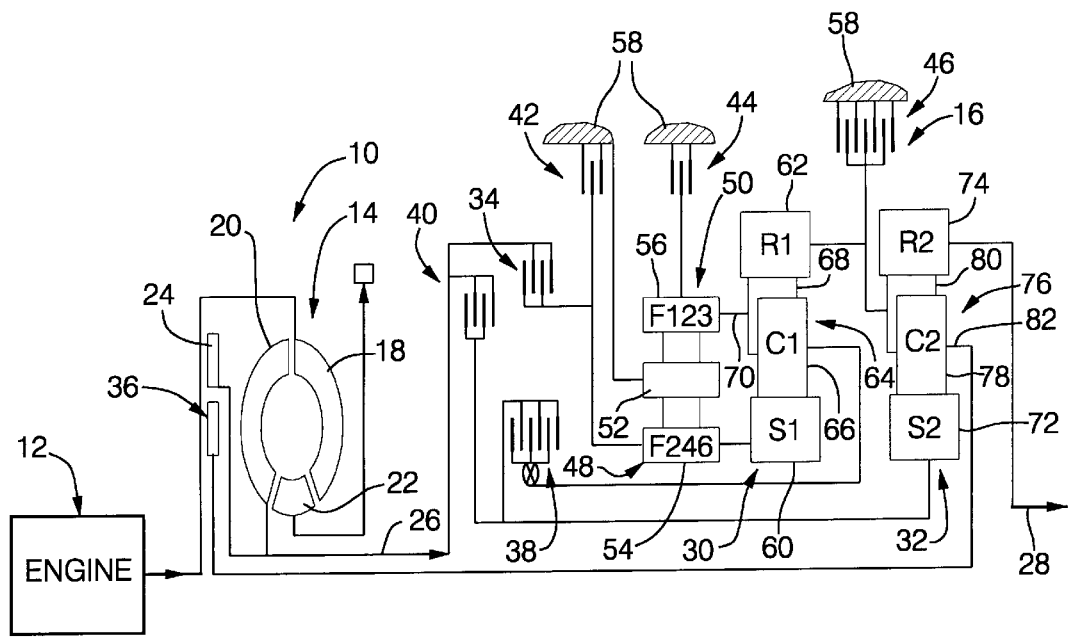
FIG. 1 is a schematic of a powertrain incorporating the present invention.
FIG. 2 is a table describing the engagement sequence of the torque transmitting mechanisms used with the powertrain of FIG. 1.

A powertrain 10 has an engine 12, a torque converter 14 and a planetary transmission 16. The engine 12 and torque converter 14 are conventional devices that are well-known in the art of power transmission. The torque converter 14 includes an impeller 18, a turbine 20 and a stator 22. A torque converter clutch 24 is disposed in the torque converter 14 and is selectively engageable to connect the impeller 18 with the turbine 20 in a well-known manner.

The planetary transmission includes an input shaft 26, an output shaft 28, a first compound planetary gear set 30, a second planetary gear set 32, four rotating torque transmitting mechanisms or clutches 34, 36, 38, and 40, three stationary torque transmitting mechanisms or brakes 42, 44, and 46, and two one way torque transmitting mechanisms 48 and 50. The stationary torque transmitting mechanisms are often termed stationary clutches by those skilled in the art. The torque transmitting mechanisms 34, 36, 38, 40, 42, and 44 are preferably fluid operated selectively engageable devices. The design and construction of such devices is well-known in the art of power transmission. The torque transmitting mechanism 44 is preferably a selectively actuated mechanical device such as a dog clutch or a jaw clutch the construction of which is well-known. The torque transmitting mechanism 38 is preferably a direction sensitive torque transmitting device such as that shown in U.S. Pat. No. 5,535,865 issued to Haka et al. on Jul. 16, 1996 and assigned to the assignee of this application.

The one-way torque transmitting mechanism 50 is preferably a selectively actuated device. These devices are commercially available. The one-way torque transmitting mechanisms 48 and 50 are radially stacked, share a common stationary race 52, and include respective races 54 and 56. The stationary race 52 is connected with a transmission housing portion 58. The race 54 is connected with both the torque transmitting mechanism 34 and the torque transmitting mechanism 42. The race 56 is connected with the torque transmitting mechanism 44. This permits the races 54 and 56 to be selectively grounded in both directions of rotation to provide engine coast braking.

The torque transmitting mechanisms 34 and 40 are selectively connectable with the input shaft 26, the torque transmitting mechanism 38 is selectively connectable with the torque transmitting mechanism 40, and the torque transmitting mechanism 36 is selectively connectable with the impeller 18. These torque transmitting mechanisms are considered to be input devices that deliver power from the engine 12 to the planetary gear sets 30 and 32 of the planetary transmission 16. The one-way torque transmitting mechanisms 48 and 50 and the selectively engageable torque transmitting mechanisms 42, 44 and 46 establish reaction members in the planetary gear sets 30 and 32. The torque transmitting mechanism 50 is preferably a selectively actuated one-way mechanism that is active during forward drives and inactive during reverse. These devices are well-known in the art of power transmission control.

The planetary gear set 30 has three rotatable members including a sun gear member 60, a ring gear member 62 and a planetary carrier assembly member 64. The planetary carrier assembly member 64 has pairs of intermeshing pinion gear members 66 and 68 that are rotatably mounted on a cage or spider 70. The pinion gear member 66 also meshes with the sun gear member 60 and the pinion gear member 68 also meshes with the ring gear member 62. The sun gear member 60 is continuously connected with the race 54 of the one-way torque transmitting mechanism 48. The sun gear member 60 can, therefore, be selectively connected with the input shaft 26 through the torque transmitting mechanism 34 or grounded to the transmission housing 58 through the torque transmitting mechanism 42 or the one way torque transmitting mechanism 48. The ring gear member is operatively connected with the torque transmitting mechanism 46 and may therefore be selectively held stationary. The planetary carrier assembly member 64 is operatively connected with the torque transmitting mechanism 38 which is connected with the torque transmitting mechanism 40.

The compound planetary gear set 32 has three rotatable members including a sun gear member 72, a ring gear member 74 and a planetary carrier assembly member 76. The planetary carrier assembly member 76 has pairs of intermeshing pinion gear members 78 and 80 that are rotatably mounted on a cage or spider 82. The pinion gear member 78 also meshes with the sun gear member 72 and the pinion gear member 80 also meshes with the ring gear member 74. The sun gear member 72 is operatively connected with the torque transmitting mechanism 38 and the torque transmitting mechanism 40. The ring gear member 74 is continuously connected with the output shaft 28. The planetary carrier assembly member 76 is continuously connected with the ring gear member 62 and the torque transmitting mechanisms 36 and 46.

The torque transmitting mechanisms 34, 36, 38, 40 and 46, and the one-way torque transmitting mechanisms 48 and 50 are active in combinations of three to provide six forward speed ratios and one reverse ratio. The torque transmitting mechanisms 42 and 44 are active to provide engine coast braking under certain conditions of vehicle operation. The torque transmitting mechanisms can be controlled by utilization of the principles found in the currently available electro-hydraulic control systems. As is well-known these electro-hydraulic control systems incorporate a preprogrammed digital computer to control the engagement and disengagement of the various torque transmitting mechanisms thereby providing acceptable ratio interchanges and vehicle launch.

To establish the reverse drive ratio, the torque transmitting mechanisms 34, 38 and 46 are actuated or engaged and the one-way torque transmitting mechanism 50 is deactivated. To launch the vehicle, the torque transmitting mechanism 38 is engaged in a controlled manner and cooperates with the torque converter 14 to provide smooth vehicle acceleration. This is commonly termed a "garage shift." This establishes the sun gear member 60 as an input member and the ring gear member 62 and the planetary carrier assembly member 76 as reaction members in the planetary transmission 16. The output shaft 28 is rotated reversely relative to the input shaft 26 at a reduced ratio. The reverse speed ratio is dependant on both compound planetary gear sets 30 and 32.

To establish the first and lowest forward speed ratio, the torque transmitting mechanism 34 is engaged, the one-way torque transmitting mechanism 50 is activated, and the torque transmitting mechanism 38 provides the garage shift or vehicle launch. In this ratio, the sun gear member 60 is an input member and the planetary carrier assembly member 64 and the sun gear member 72 are reaction members. The output shaft 28 is rotated forwardly at a reduced ratio relative to the input shaft 26. The first forward speed ratio is determined by both compound planetary gear sets 30 and 32.

To establish the second forward speed ratio, the torque transmitting mechanisms 34 and 38 are disengaged while the torque transmitting mechanisms 40 and 48 are engaged. This is a double transition or swap shift. This event can be accommodated by a conventional electro-hydraulic control. The compound planetary gear set 30 is held stationary by the torque transmitting mechanisms 48 and 50 and therefore the planetary carrier assembly member 76 is a reaction member. The sun gear member 72 is an input member. The ring gear member 74 and the output shaft 28 are driven forwardly at a reduced speed relative to the input shaft 26, the second forward speed ratio is determined solely by the compound planetary gear set 32.

To establish the third forward speed ratio, the torque transmitting mechanism 34 is engaged and the torque transmitting mechanism 48 overruns. The sun gear member 72 and the sun gear member 60 are input members and the planetary carrier assembly member 64 is a reaction member. The ring gear member 62 and the planetary carrier assembly member 76 rotate forwardly at a reduced speed. The planetary carrier assembly member 76 and sun gear member 72 both contribute to the forward rotation of the ring gear member 74 and output shaft 28 which rotate at a reduced rotation relative to the input shaft 26. The two/three ratio interchange is a single transition shift. The third forward speed ratio is determined by both compound planetary gear sets 30 and 32.

To establish the fourth forward speed ratio, the torque transmitting mechanism 34 is disengaged, the torque transmitting mechanism 38 is engaged, the torque transmitting mechanism 50 overruns and the torque transmitting mechanism 48 is active. This establishes the sun gear member 60 as a reaction member and the planetary carrier assembly member 64 and the sun gear member 72 as input members. With the planetary carrier assembly member 64 driven forwardly, the ring gear member 74 and the planetary carrier assembly member 76 also rotate forwardly as in the third ratio but at a higher speed. The ring gear member 74 and the output shaft 28 rotate forwardly at a reduced speed relative to the input shaft 26. The three/four ratio interchange is a swap shift which is easily accommodated by the control system and the one-way torque transmitting mechanisms 48 and 50. The fourth forward speed ratio is determined by both compound planetary gear sets 30 and 32.

To establish the fifth forward speed ratio, the torque transmitting mechanism 36 is engaged and the torque transmitting mechanism 48 will be in an overrun condition. The four/five interchange is a single transition shift. With the torque transmitting mechanisms 36, 38 and 40 engaged, the compound planetary gear set 32 is conditioned for a direct drive or one-to-one ratio. Thus the input shaft 26 and output shaft 28 rotate in unison.

The sixth forward speed ratio is established with the disengagement of the torque transmitting mechanism 40 and the one-way torque transmitting mechanism 48 becoming active. This establishes the planetary carrier assembly member 76 and the ring gear member 62 as input members and the sun gear member 60 as a reaction member. The planetary carrier assembly member 64 and the sun gear member 72 are rotated forwardly at an overdrive speed ratio due to the influence of the ring gear member 62 and sun gear member 60. The ring gear member 74 and the output shaft 28 rotate forwardly at an overdrive ratio. Thus the output speed is greater than the input speed. Both of the compound planetary gear sets 30 and 32 contribute to the sixth forward speed ratio. The five/six ratio interchange is a single transition shift.

The table shown in FIG. 2 describes the shift sequence for the speed ratios as described above. The table also provides a set of ratios numbers that can be attained with the above described planetary transmission 16. These ratio numbers are dependant on the ring gear to sun gear ratio in both compound planetary gear sets being 2.60. FIG. 2 also sets forth that the torque transmitting mechanism 44 is engaged to provide coast braking in the first and third forward speed ratios, the torque transmitting mechanism 42 is engaged to provide coast braking in the fourth and sixth forward speed ratios, and both torque transmitting mechanisms 42 and 44 are engaged to provide coast braking in the second forward ratio. Coast braking is always available in the fifth forward ratio.

What is claimed is:

1. A powertrain having a multi-speed planetary transmission comprising:

a power source including an input shaft;

an output shaft;

a first compound planetary gear set having three rotatable members including a sun gear member, a ring gear member, and a planetary carrier assembly member;

a second compound planetary gear set having three rotatable members including a sun gear member, a ring gear member, and planetary carrier assembly member, said ring gear member being continuously drivingly connected with said output shaft, said planetary carrier assembly member being continuously connected for common rotation with said ring gear member of said first compound planetary gear set;

a first selectively operable torque transmitting mechanism connectable between said power source and said sun gear member of said first compound planetary gear set;

a second selectively operable torque transmitting mechanism connectable between said planetary carrier assembly member of said first compound planetary gear set and said sun gear member of said second compound planetary gear set;

a third selectively operable torque transmitting mechanism connectable between said power source and said sun gear member of said second compound planetary gear set;

a fourth selectively operable torque transmitting mechanism connectable between said power source and said planetary carrier assembly member of said second compound planetary gear set;

a fifth selectively operable torque transmitting mechanism connectable between a stationary member and both said planetary carrier assembly member of said second compound planetary gear set and said ring gear member of said first compound planetary gear set;

a sixth selectively operable torque transmitting mechanism connected between said stationary member and said planetary carrier assembly member of said first compound planetary gear set;

a seventh selectively operable torque transmitting mechanism connectable between said stationary member and said sun gear member of said first compound planetary gear set; and said torque transmitting mechanisms being operated in combinations of three to establish six forward speed ratios and one reverse speed ratio between said power source and said output shaft.

2. The powertrain defined in claim 1 further wherein:

said sixth selectively operable torque transmitting mechanism and said seventh selectively operable torque transmitting mechanism each comprise a selectively engageable friction device and a one-way drive means disposed in parallel.

3. The powertrain defined in claim 1 further wherein:

said third selectively operable torque transmitting mechanism and said second selectively operable torque transmitting mechanism being operated in unison to establish said planetary carrier assembly member of said first compound planetary gear set and said sun gear member of said second compound planetary gear set as input members; and said second selectively operable torque transmitting mechanism and said seventh selectively operable torque transmitting mechanism being operated in unison to establish said planetary carrier assembly member of said first compound planetary gear set and said sun gear member of said second compound planetary gear set as reaction members.

4. The powertrain defined in claim 1 further wherein:

said second selectively operable torque transmitting mechanism is active during four forward speed ratios and said reverse speed ratio;

said third selectively operable torque transmitting mechanism being active during four forward speed ratios; and said sixth and seventh selectively operable torque transmitting mechanisms are active in unison during one of the forward speed ratios and independently during two of the forward speed ratios.

5. A powertrain having a multi-speed planetary transmission comprising:

a power source including an input shaft;

an output shaft;

a first compound planetary gear set having first, second, and third rotatable members;

a second compound planetary gear set having fourth, fifth, and sixth rotatable members, said sixth rotatable member being continuously drivingly connected with said output shaft, said fifth rotatable member being continuously connected for common rotation with said third rotatable member of said first compound planetary gear set;

a first selectively operable torque transmitting mechanism connectable between said power source and said first rotatable member;

a second selectively operable torque transmitting mechanism connectable between said second rotatable member and said fourth rotatable member;

a third selectively operable torque transmitting mechanism connectable between said power source and said fourth rotatable member;

a fourth selectively operable torque transmitting mechanism connectable between said power source and said fifth rotatable member;

a fifth selectively operable torque transmitting mechanism connectable between a stationary member and both said third and fifth rotatable members;

a sixth selectively operable torque transmitting mechanism connected between said stationary member and said second rotatable member;

a seventh selectively operable torque transmitting mechanism connectable between said stationary member and said first rotatable member; and said torque transmitting mechanisms being operated in combinations of three to establish six forward speed ratios and one reverse speed ratio between said power source and said output shaft.

6. The powertrain defined in claim 5 further wherein:

said sixth selectively operable torque transmitting mechanism and said seventh selectively operable torque transmitting mechanism each comprise a selectively engageable friction device and a one-way drive means disposed in parallel.

7. The powertrain defined in claim 5 further wherein:

said third selectively operable torque transmitting mechanism and said second selectively operable torque transmitting mechanism being operated in unison to establish said second rotatable member and said fourth rotatable as input members; and said second selectively operable torque transmitting mechanism and said seventh selectively operable torque transmitting mechanism being operated in unison to establish said second rotatable member and said fourth rotatable member as reaction members.

8. The powertrain defined in claim 1 further wherein:

said second selectively operable torque transmitting mechanism is active during four forward speed ratios and said reverse speed ratio;

said third selectively operable torque transmitting mechanism being active during four forward speed ratios; and said sixth and seventh selectively operable torque transmitting mechanisms are active in unison during one of the forward speed ratios and independently during two of the forward speed ratios.

\* \* \* \* \*